(12) United States Patent
Haen

(10) Patent No.: US 9,462,908 B2
(45) Date of Patent: Oct. 11, 2016

(54) WINDOW COVERING FASTENER PARTICULARLY SUITABLE FOR ARCHED COVERINGS

(71) Applicant: Springs Window Fashions, LLC, Middleton, WI (US)

(72) Inventor: William George Haen, Lodi, WI (US)

(73) Assignee: SPRINGS WINDOW FASHIONS, LLC, Middleton, WI (US)

( * ) Notice: Subject to any disclaimer, the term of this patent is extended or adjusted under 35 U.S.C. 154(b) by 63 days.

(21) Appl. No.: 14/452,776

(22) Filed: Aug. 6, 2014

(65) Prior Publication Data

US 2014/0345093 A1    Nov. 27, 2014

Related U.S. Application Data

(63) Continuation of application No. PCT/US2013/024758, filed on Feb. 5, 2013.

(60) Provisional application No. 61/595,352, filed on Feb. 6, 2012.

(51) Int. Cl.
*A47H 3/00* (2006.01)
*A47H 1/18* (2006.01)
*E06B 9/24* (2006.01)
*E06B 9/262* (2006.01)
(Continued)

(52) U.S. Cl.
CPC . *A47H 1/18* (2013.01); *E06B 9/24* (2013.01); *E06B 9/262* (2013.01); *E06B 9/38* (2013.01); *F16B 2/20* (2013.01); *E06B 2009/2488* (2013.01); *E06B 2009/2627* (2013.01); *Y10T 24/44026* (2015.01)

(58) Field of Classification Search
CPC . Y10T 24/1365; Y10T 24/3467; A47H 1/18; F16B 2/20; E06B 9/262; E06B 2009/2627; E06B 2009/2625; E06B 2009/2622
USPC ......... 160/84.07, 84.01, 84.04, 84.05, 368.1, 160/404, 134, 349.2, 177 V, 178.1 V, 167 V, 160/168.1 V, 172 V, 174 V, 176.1 V; 248/231.81, 316.7, 229.16
See application file for complete search history.

(56) References Cited

U.S. PATENT DOCUMENTS

| | | | | |
|---|---|---|---|---|
| 714,348 A | * | 11/1902 | Youngblood | .......... F16M 13/02 24/343 |
| 1,434,532 A | * | 11/1922 | Davala | .................... D06F 55/00 24/300 |

(Continued)

OTHER PUBLICATIONS

Notification Concerning Transmittal of International Preliminary Report on Patentability dated Aug. 21, 2014 for International Application No. PCT/US2013/024758 (6 pages).

(Continued)

*Primary Examiner* — Katherine Mitchell
*Assistant Examiner* — Johnnie A Shablack
(74) *Attorney, Agent, or Firm* — Michael Best & Friedrich LLP

(57) ABSTRACT

A window covering fastener useful for securing the edge of window covering material, such as an arched shade. The fastener includes a clip that slides over the edge of the material and is secured by a pin inserted into the clip to pass through the material. A bracket of the fastener is installed on the structure of or surrounding a window. The bracket and clip engage one another.

19 Claims, 7 Drawing Sheets

(51) Int. Cl.
*E06B 9/38* (2006.01)
*F16B 2/20* (2006.01)

(56) References Cited

U.S. PATENT DOCUMENTS

| | | | | |
|---|---|---|---|---|
| 1,606,583 A * | 11/1926 | Ladd | A47H 13/01 | 160/348 |
| 2,083,614 A * | 6/1937 | McPhee | A44B 9/00 | 132/276 |
| 2,113,953 A * | 4/1938 | Steinberger | A47H 13/14 | 160/348 |
| 2,125,202 A * | 7/1938 | William | A47H 13/04 | 24/351 |
| 2,668,338 A * | 2/1954 | Harrison | A47G 25/1478 | 24/561 |
| 2,874,494 A * | 2/1959 | Emmert | A41D 29/00 | 24/13 |
| 3,137,027 A * | 6/1964 | Birkle | A47H 13/01 | 16/87.2 |
| 3,187,370 A * | 6/1965 | Bieda | A47H 13/04 | 16/87.4 R |
| 3,286,299 A * | 11/1966 | Golden | A47H 15/04 | 16/87.4 R |
| 3,378,879 A * | 4/1968 | Stall | A47H 13/04 | 16/87.4 R |
| 3,444,595 A * | 5/1969 | Wachenheimer | A47H 13/04 | 160/348 |
| 3,447,209 A * | 6/1969 | Sullivan | A41F 1/00 | 24/351 |
| 3,462,803 A * | 8/1969 | Horton | A41H 37/001 | 156/73.1 |
| 3,626,429 A * | 12/1971 | Toder | A47H 13/00 | 16/87.2 |
| 3,796,405 A * | 3/1974 | Rystad | E05D 15/0634 | 248/316.7 |
| 3,797,076 A * | 3/1974 | Watkin | A44B 99/00 | 24/562 |
| 3,992,749 A * | 11/1976 | Getchell | A47H 13/04 | 16/93 D |
| 4,359,080 A * | 11/1982 | Brydolf | E05D 15/26 | 160/183 |
| 4,520,536 A * | 6/1985 | Hata | A41F 9/00 | 2/320 |
| 4,642,859 A * | 2/1987 | Kaiser | F16B 21/16 | 24/295 |
| 4,699,195 A * | 10/1987 | Lester | E06B 9/26 | 160/134 |
| 4,776,380 A | 10/1988 | Lester | | |
| 4,793,396 A * | 12/1988 | Anderson | E06B 9/262 | 160/178.1 R |
| 4,876,771 A * | 10/1989 | Givati | D06F 55/00 | 211/119.13 |
| 5,584,329 A | 12/1996 | Thomas | | |
| 5,692,806 A * | 12/1997 | Jones | B60R 22/19 | 24/561 |
| 5,794,680 A | 8/1998 | Xue | | |
| 5,918,417 A * | 7/1999 | Kinder | E06B 1/006 | 160/DIG. 16 |
| 6,000,456 A * | 12/1999 | Neverett | E06B 9/362 | 160/177 V |
| 6,289,563 B1 * | 9/2001 | Watkins | E06B 9/367 | 160/178.1 V |
| 6,298,526 B1 * | 10/2001 | Baumdicker | A44B 99/00 | 24/306 |
| 6,585,027 B1 * | 7/2003 | Roberts | E06B 9/262 | 160/349.1 |
| 6,651,722 B1 * | 11/2003 | Fleishman | E06B 9/26 | 160/168.1 V |
| 6,675,449 B2 * | 1/2004 | Wales | A44B 99/00 | 24/304 |
| 6,758,256 B1 | 7/2004 | Garcia | | |
| 6,877,546 B1 | 4/2005 | Garcia | | |
| 7,185,693 B1 * | 3/2007 | Hines | E06B 9/24 | 160/327 |
| 7,188,658 B1 * | 3/2007 | Nordstrom | E06B 9/32 | 160/134 |
| 7,240,714 B2 * | 7/2007 | Drew | E06B 9/26 | 160/84.04 |
| 7,308,739 B2 * | 12/2007 | Andersen | A44B 99/00 | 24/535 |
| 7,451,801 B2 * | 11/2008 | Park | E06B 9/367 | 160/173 V |
| 7,513,294 B2 * | 4/2009 | Jelic | E06B 9/262 | 160/349.1 |
| 7,650,922 B2 * | 1/2010 | Alberti | E06B 9/36 | 160/134 |
| 7,721,782 B2 * | 5/2010 | Foley | E06B 9/266 | 160/134 |
| 7,996,963 B2 * | 8/2011 | Cameron | B60P 7/0823 | 24/344 |
| 8,118,077 B2 * | 2/2012 | Pflieger | E06B 9/262 | 160/134 |
| 8,459,325 B2 * | 6/2013 | Faller | E06B 9/262 | 160/134 |
| 8,511,631 B2 * | 8/2013 | Kato | B60R 13/0206 | 24/297 |
| 8,776,860 B2 * | 7/2014 | Wen | E06B 9/362 | 160/167 V |
| 9,140,525 B2 * | 9/2015 | Yakoub | F41H 5/02 | |
| 2008/0093031 A1 * | 4/2008 | Alberti | E06B 9/36 | 160/84.07 |
| 2008/0093032 A1 * | 4/2008 | Foley | E06B 9/266 | 160/84.07 |
| 2010/0095492 A1 * | 4/2010 | Boone | H01R 4/2408 | 24/457 |
| 2010/0107376 A1 * | 5/2010 | Reznar | F16B 5/065 | 24/457 |
| 2011/0146919 A1 * | 6/2011 | Smith | E06B 9/26 | 160/115 |
| 2013/0259595 A1 * | 10/2013 | Hiramatsu | F16B 41/002 | 411/107 |

OTHER PUBLICATIONS

International Search Report dated May 24, 2013 for International Application No. PCT/US2013/024758 (2 pages).

\* cited by examiner

WINDOW COVERING FASTENER PARTICULARLY SUITABLE FOR ARCHED COVERINGS

CROSS REFERENCE TO RELATED APPLICATIONS

This is a continuation of PCT application No. PCT/US2013/024758, entitled "WINDOW COVERING FASTENER PARTICULARLY SUITABLE FOR ARCHED COVERINGS", filed Feb. 5, 2013, which is incorporated herein by reference. PCT application No. PCT/US2013/024758 is a non-provisional application based upon U.S. provisional patent application Ser. No. 61/595,352, entitled "WINDOW COVERING FASTENER PARTICULARLY SUITABLE FOR ARCHED COVERINGS", filed Feb. 6, 2012, which is incorporated herein by reference.

BACKGROUND OF THE INVENTION

1. Field of the Invention

The present invention relates generally to window covering installations, more particularly to arched window coverings, and, still more specifically to fasteners used to secure the outer edge of arched shade material.

2. Description of the Related Art

Arched windows are often used to provide decorative interest and architectural detail in buildings of all types. In some instances, it is desirable to provide a window covering over the arched opening to control light entering through the window or to provide privacy. Window coverings also can add an additional level of decorative detail.

Many different types of window coverings have been used in arched openings. It is known to provide a mounting rail along the horizontal surface of the arched opening, which often will be at the bottom of the arched opening. The shade material than extends outwardly from the bottom rail and may or may not be movable. In some situations it is desirable to secure the curved outer edge of the shade material to the window opening along the entire edge in a channel or other arched holder retaining the fabric and mounted in the window opening. It is known also to use discrete fasteners at several spaced locations along the edge of the material, or at least a single fastener in the center of the fabric and window opening.

It is known to use a one-piece fastener that is secured to the outer edge of the window covering fabric and then screwed or otherwise fastened to the window frame during installation. Such installations have been difficult to complete in that the installer must first locate the center of the arched material so that one fastener can be secured at the center of the material and the center of the opening. Additional fasteners can be added at spaced locations along the edge. This requires accurately measuring the curved peripheral edge of the window covering material or counting the pleats in pleated material or cells in so-called cellular window covering material, and then completing attachment to the material and to an accurately determined window location. Failure to locate the correctly corresponding locations on the material and the window frame can result in an unbalanced appearance of the shade material in the window opening, often requiring redoing the attachment.

Known fasteners have used aggressive frictional engagements with the fabric material and/or adhesive attachment, each of which have resulted in damage to the fabric material in some instances as the fastener is being attached. Further, if it becomes necessary to move the fastener, perhaps because it was secured in a wrong location initially, removing the fastener from the material can be difficult and may result in unacceptable visible damage to the fabric material. Still further, the use of a one-piece clip is awkward in that, if the clip is first fastened to the shade material, securing the clip by screws or the like in the window frame can be difficult as the shade material interferes with access. Alternatively, if the fastener is first screwed into the window frame, inserting the fabric into the frictional engagement portion of the fastener can be difficult because of the limited space available. Again the cumbersome techniques required for attaching the one-piece fastener to both the shade material and the window opening can result in damage to the shade and/or soiling of the shade due to the manual manipulation required.

What is needed is a fastening system useful on shades of all types, but particularly useful for arched shades, having separate components that can be secured to the window and to the shade material separately and thereafter brought together to hold the shade material as desired. A simplified structure for securing the clip to the shade material is desirable, preferably one that can be attached, detached and reattached in the same or different locations without perceptible damage to the shade material.

SUMMARY OF THE INVENTION

A window covering fastener described herein includes two parts, a clip that can be separately and independently installed on the material of a window covering, and a bracket that can be separately and independently installed on the structure of or surrounding a window or other architectural opening. The bracket and clip engage one another.

In one aspect of a form thereof, a window covering fastener is provided with a clip having a head and a body, the body defining a slot to receive window covering material therein, and a hole extending in the clip from an opening in an outer surface of the clip, the hole intersecting the slot in the clip. A pin is received in the hole and thereby crosses the slot. A bracket receives and secures the head therein, the bracket being configured to be mounted at a fixed location.

In another aspect of a form thereof, a window covering fastener is provided with a clip having a head, a neck and a body, the head being wider than the neck, and the neck being between the head and the body. A slot is defined in the body and has an opening thereto in an end of the body, the slot width having openings along the side of the body and being of sufficient thickness to receive en edge portion of window covering material therein. A hole extends in the clip from an opening in an outer surface of the clip, the hole intersecting the slot in the clip. A pin received in the hole and crosses the slot. A bracket is configured to receive and hold the head therein, the bracket being further configured to be mounted at a fixed location In still another aspect of a form thereof, a two piece window covering fastener is provided with a bracket configured for attachment to an architectural opening, a clip defining a slot to receive an edge of window covering material therein and an elongate hole to receive a common pin therein, and a common pin inserted in the hole and crossing the slot. The bracket and clip are configured to releasably engage one another.

Other features and advantages of the invention will become apparent to those skilled in the art upon review of the following detailed description, claims and drawings in which like numerals are used to designate like features.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawing(s), wherein.

Figure 1:
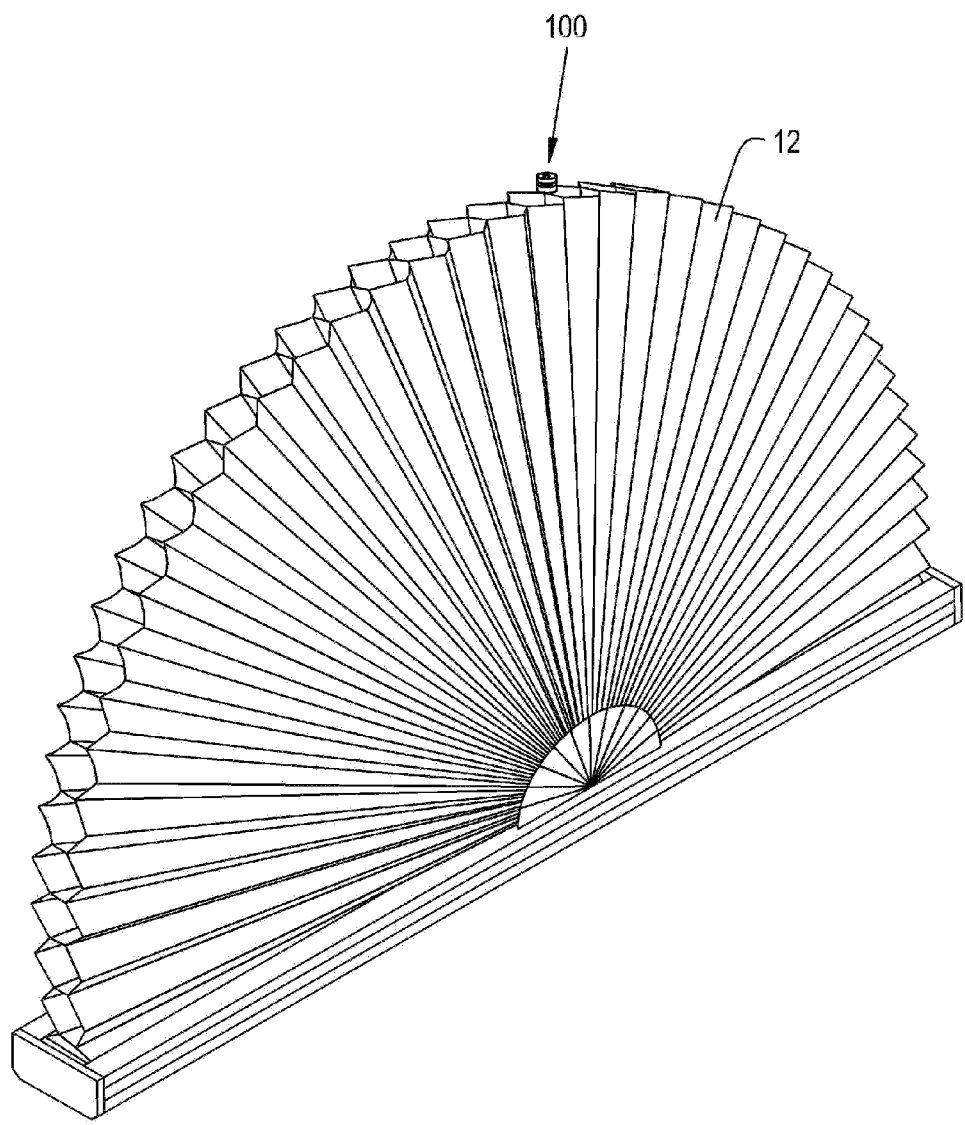
FIG. 1 is a perspective view of a clip for a window covering fastener installed on an arched shade.

Corresponding reference characters indicate corresponding parts throughout the several views. The exemplification(s) set out herein illustrate(s) (one) embodiment(s) of the invention ('in one form') and such exemplification(s) (is) (are) not to be construed as limiting the scope of the invention in any manner.

DETAILED DESCRIPTION OF THE INVENTION

Figure 2:
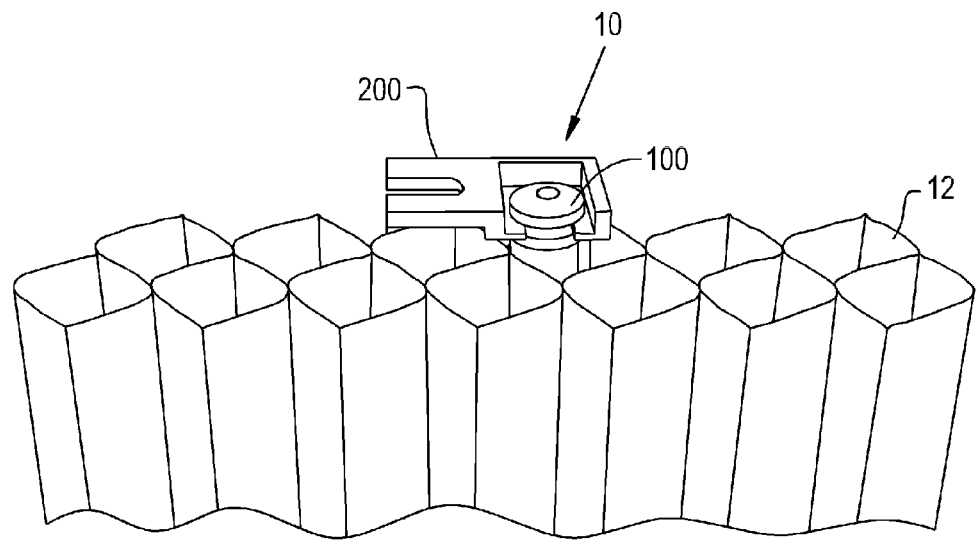
FIG. 2 is an enlarged fragmentary view of the clip and arched shade as shown in FIG. 1, further showing the clip engaged with a bracket of the window covering fastener.
Figure 3:
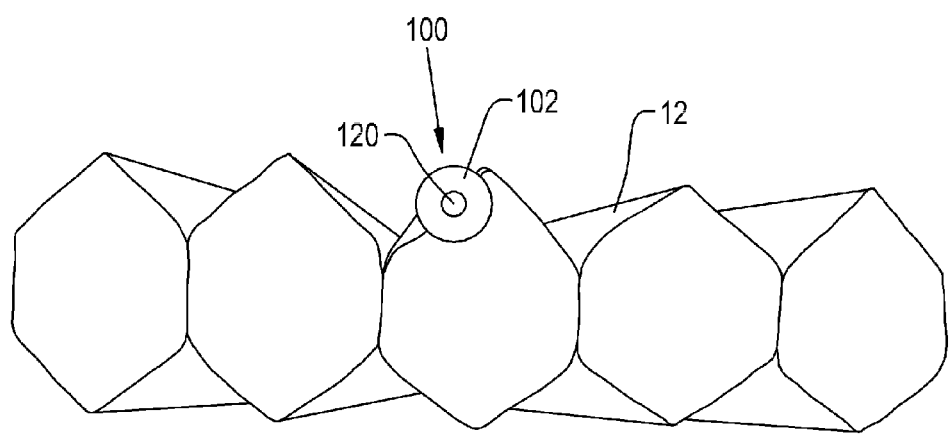
FIG. 3 is an enlarged fragmentary top view of the clip and arched shade as shown in FIG. 1.
Figure 4:
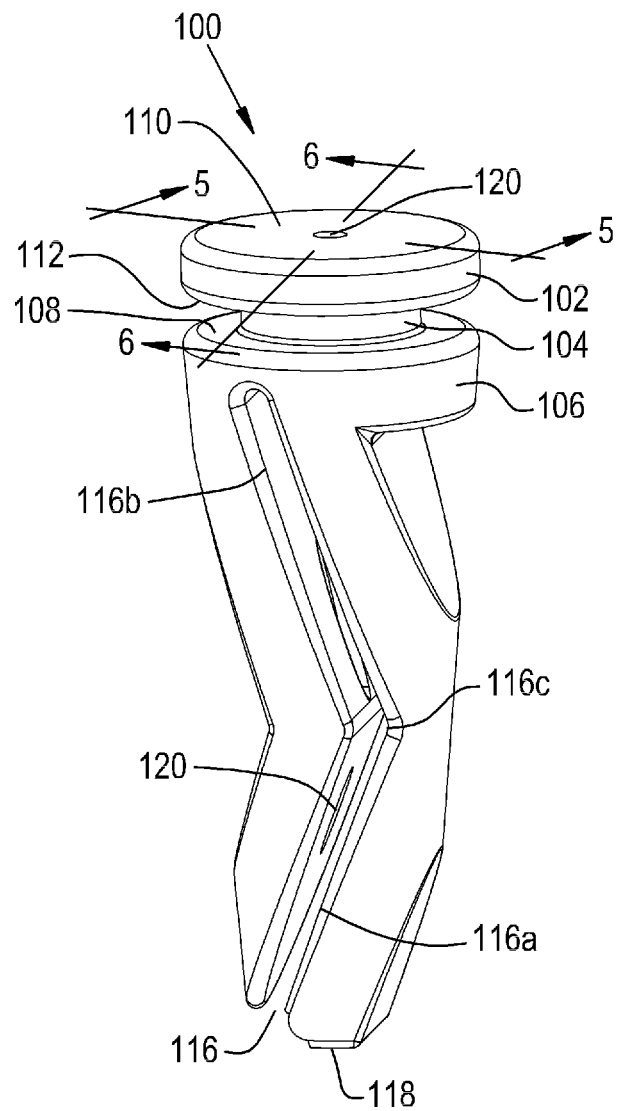
FIG. 4 is an enlarged elevational view of the clip.
Figure 9:
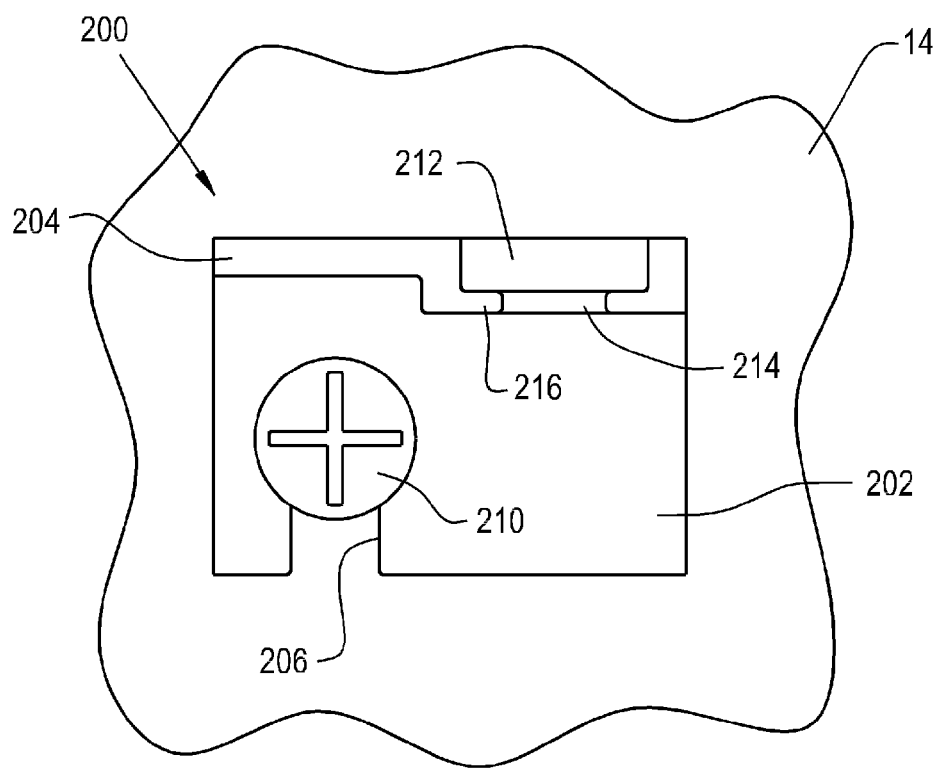
FIG. 9 is an elevational view of the bracket installed in a window structure.

Referring now more particularly to the drawings, an assembled window covering fastener 10 is shown in FIG. 2. Fastener 10 includes an arch clip 100 and an arch clip mount bracket 200. Arch clip 100 is designed for attachment to a material edge of a window covering 12, such as, for example, an arched window covering material 12 as shown in FIG. 1. Clip mount bracket 200 is designed for attachment to a window frame or window opening structure 14, as shown in FIG. 9, or to another architectural opening. Clip 100 and bracket 200 are connectable one to the other. FIG. 2 shows clip 100 and bracket 200 assembled together, with clip 100 installed on an edge portion of window covering material. While not so shown in FIG. 2, it should be understood that, in use, bracket 200 is attached to structure adjacent the window opening, as shown separately for bracket 200 in FIG. 9.

Figure 5:
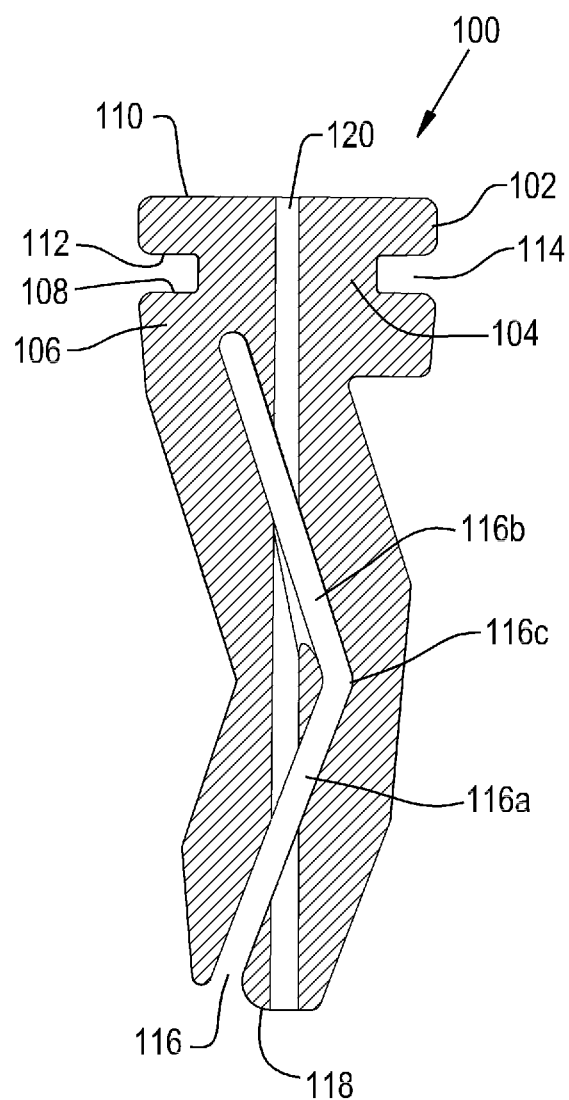
FIG. 5 is a cross-sectional view of the clip shown in FIG. 4, taken along line 5-5 indicated in FIG. 4.
Figure 6:
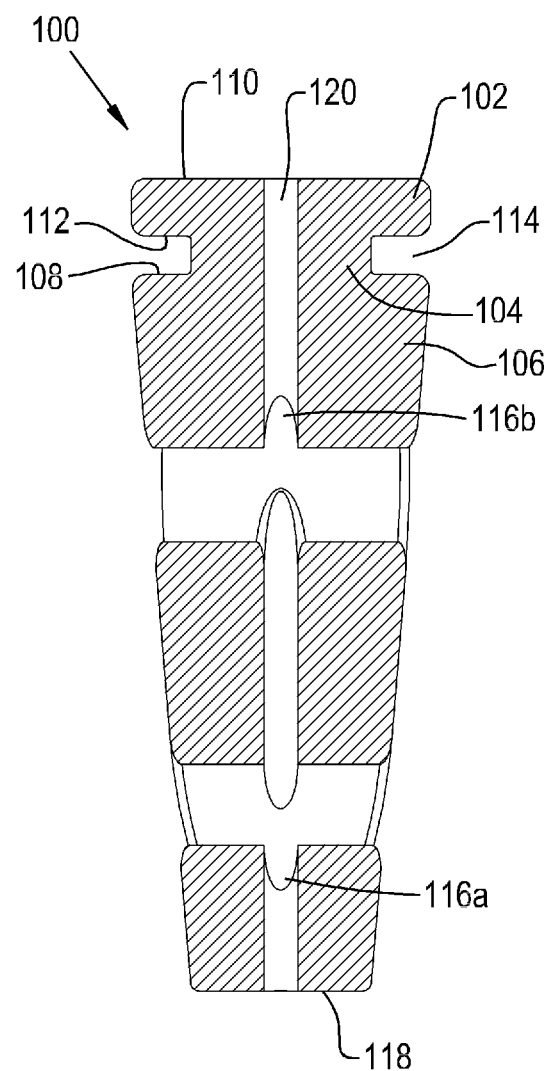
FIG. 6 is a cross-sectional view of the clip shown in FIG. 4, taken along line 6-6 indicated in FIG. 4.

Arch clip 100 includes a head 102, a neck 104 and a body 106. Head 102, neck 104 and body 106 are configured to cooperate with bracket 200 to secure clip 100 in bracket 200, as will be described subsequently herein. Accordingly, head 102 has a substantially rounded outer periphery, as does neck 104, with neck 104 being of a smaller diameter than the diameter of head 102. Body 106 is an elongated projection from neck 104, and is of generally greater width than the width or diameter of neck 104, thus forming a shoulder surface 108 extending outwardly from the interface with the end of neck 104 opposite from head 102. Head 102 has an outer surface 110 and an under surface 112 that extends outwardly from the interface of head 102 with the end of neck 104 opposite from body 106. Together, neck 104, shoulder surface 108 and under surface 112 define an annular channel 114 (seen most clearly in FIGS. 5 & 6) outwardly of neck 104 and between spaced surfaces 108 and 112.

A non-straight slot 116 extends substantially the length of body 106, and has a length extending from an open slot end in a distal end 118 of body 106 to a closed slot end near neck 104. In width, slot 116 extends from one side of body 106 to the opposite side of body 106. Slot 116 thereby defines elongate openings in the opposite sides of body 106 along the length of the slot so that clip 100 can slide over an edge portion of shade material, with the shade material extending outwardly from the elongate side openings of the slot on opposite sides of body 106. Slot 116 is of sufficient thickness to minimally receive therein the material 12 of a window covering on which it is installed. As mentioned, slot 116 is not straight, and in the exemplary embodiment shown includes two slot segments angularly disposed relative to one another. A generally straight outer slot segment 116a and a generally straight inner slot segment 116b meet at an apex 116c to define an overall slot 116 having a non-straight, relaxed V-shape.

A straight hole 120 extends through clip 100 from outer surface 110 of head 102 to distal end 118 of body 106. In passing through body 106, hole 120 intersects slot 116 at two locations, one in inner slot segment 116b and one in outer slot segment 116a. Hole 120 is of sufficient diameter to receive a common straight pin 122 therein, and may receive the pin in frictional engagement to hold the pin snuggly in the hole. Pin 122 includes a shank 124 received in hole 120 and a pin head 126 sufficiently larger than the diameter of hole 120 so that pin head 126 can not enter hole 120.

Figure 7:
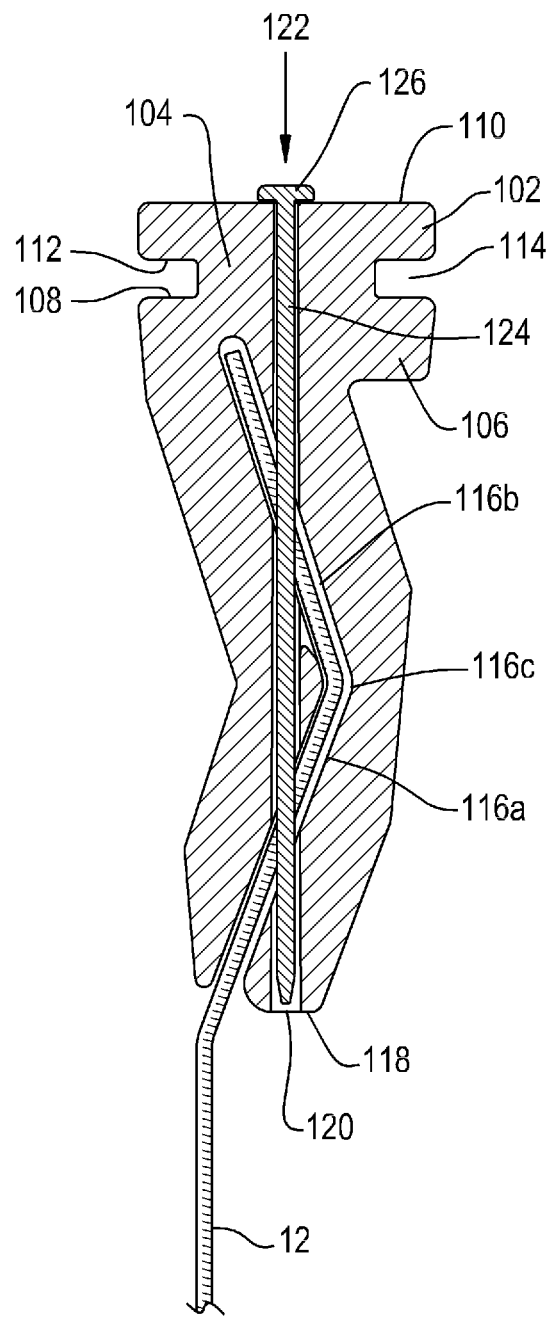
FIG. 7 is a cross-sectional view similar to that of FIG. 5, but showing the clip installed on window covering material.
Figure 8:
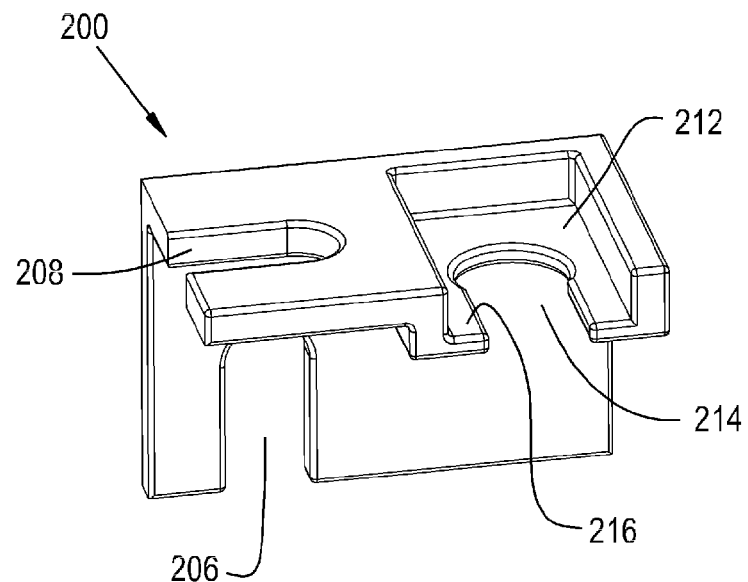
FIG. 8 is an enlarged perspective view of the bracket of the window covering fastener.

A window covering material can be inserted into slot 116 as shown in FIG. 7, substantially filling the slot along the slot width and across the slot thickness, for substantially the full length of the slot from the closed end thereof below neck 104 through the open end thereof at distal end 118. Then, as pin 122 is inserted through hole 120, the pin passes through the material at two spaced locations, one location in a section of material disposed in inner slot segment 116b and the other location in a section of material disposed in outer slot segment 116a. Clip 100 thereby remains fastened to the material via the pin passing through the material in the slot.

Bracket 200 is a right angle body having adjacent portions 202, 204. A first mounting slot 206 is defined in portion 202, extending inwardly from the bottom edge thereof. A second mounting slot 208 is provided extending inwardly from one of the side edges of portion 204. Accordingly, depending upon the location and configuration in which the bracket is being installed, either of the slots 206, 208 can be used for receiving a screw 210 or other fastener to secure bracket 200 in a window frame or other architectural opening structure 14. Portion 204 further includes a depression or pocket 212 having an access slot 214 thereto extending inwardly from the outer edge of portion 204. Slot 214 is of sufficient width to receive neck 104 sliding therethrough, but is insufficiently wide for head 102 to pass therethrough. Depression or pocket 212 is of sufficient width and shape to receive and hold head 102 therein, without the head passing therethrough. Depression or pocket 212 includes a floor 216 generally received in annular channel 114 when clip 100 is suspended from bracket 200, with head 102 above floor 216 in pocket 212, and body 106 suspended below pocket 212. Accordingly, bracket 200 can be mounted in a suitable location so as to receive and hold arch clip 100 therein so that an edge of a window covering or the like can be secured in relative position with respect to a window opening in which it is installed.

The clip and bracket can be molded of clear plastic to be relatively inconspicuous as installed. The two-piece design facilitates installation by providing convenient attachments of the separate components to the material of the blind and to the structure defining the window opening. Thereafter, after each has been installed in a proper location, the two can be brought together and secured to position and secure the edge of the covering material. Clip 100 is relatively inconspicuous and small and can be attached easily and quickly during manufacture of the blind. Since it is necessary to find the middle of the blind material when the arch is being cut, the fabricator can then easily install one of the clips 100 at the center position, thereby relieving the burden on the installer to find the exact center of the blind material. The installer need only find the center of the window opening in which to install a suitable bracket 200 to engage the preinstalled clip 100. Thereafter, the installer can position additional clips 100 and brackets 200 at the extreme ends of the blind and/or at various positions between the ends and the center, as necessary. The center clip and bracket can be installed and affixed one to the other before remaining clips and brackets are installed, and the arched blind can be evenly arranged since each individual assembly of a bracket and clip can be finalized and secured before the next attempted. The fastener attaches to fabric material of a window blind by the common pin passing through the material while making only two small holes through the material. Accordingly, the fastener can be removed and repositioned if necessary, without significantly affecting the appearance of the window blind.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A window covering fastener, comprising:
   a clip having a head and a body, the body defining a slot including a first slot segment positioned oblique to a second slot segment, the slot segments configured to receive window covering material therein;
   a hole extending in the clip from an opening in an outer surface of the clip, the hole intersecting the slot in the clip in a plurality of locations;
   a pin received in the hole and thereby crossing the slot; and
   a bracket receiving and securing the head therein, the bracket being configured to be mounted at a fixed location.

2. The window covering fastener of claim 1, said slot defining a non-straight path through said body.

3. The window covering fastener of claim 1, said hole intersecting said slot in two locations.

4. The window covering fastener of claim 1, said bracket defining a pocket configured to hold said head therein.

5. The window covering fastener of claim 1, said clip having a neck between said head and said body, said necking being narrower than said head; said bracket having a pocket to receive said head therein and an access slot to said pocket configured to pass said neck therethrough.

6. The window covering fastener of claim 1, said hole intersecting each of the first slot segment and the second slot segment.

7. The window covering fastener of claim 6, said bracket defining a pocket configured to hold said head therein.

8. A window covering fastener, comprising:
   a clip having a head, a neck and a body, the head being wider than the neck, and the neck being between the head and the body;
   a slot defined in the body and having an opening thereto in an end of the body, the slot defining a first slot segment and a second slot segment, the slot segments configured to receive an edge portion of window covering material therein;
   a hole extending in the clip from an opening in an outer surface of the clip, the hole intersecting the slot in the clip; and
   a pin received in the hole and thereby crossing the slot through at least the first slot segment and the second slot segment, the pin being configured to engage the window covering material at least once in each slot segment.

9. The window covering fastener of claim 8, said hole extending from an opening in said head.

10. The window covering fastener of claim 8, said hole intersecting said slot in at least the first slot segment and the second slot segment.

11. The window covering fastener of claim 8, said bracket having a pocket configured to receive said head therein and an access slot to said pocket configured to pass said neck therethrough.

12. The window covering fastener of claim 8, further comprising a bracket configured to receive and hold the head therein, the bracket being further configured to be mounted at a fixed location.

13. The window covering fastener of claim 8, said slot defining a non-straight path through said body.

14. The window covering fastener of claim 13, said first slot segment being positioned oblique to said second slot segment.

15. The window covering fastener of claim 13, said hole intersecting said slot in two locations.

16. The window covering fastener of claim 15, said hole extending from an opening in said head.

17. A two piece window covering fastener, comprising:
   a bracket configured for attachment to an architectural opening;
   a clip defining a slot to receive an edge of window covering material therein and an elongate hole that intersects the slot at a plurality of offset locations; and a pin configured to be received by the hole, wherein the bracket and the clip are configured to releasably engage one another.

18. The two piece window covering fastener of claim 17, said clip including a head and an elongated body, said slot having a plurality of angular slot segments and said hole crossing through each of said angular slot segments.

19. The two piece window covering fastener of claim 17, wherein in response to the pin being received by the hole, the pin is configured to cross the slot at a plurality of locations, the pin engages the window covering material at each location.

\* \* \* \* \*